United States Patent
Takeuchi et al.

(10) Patent No.: US 12,345,088 B2
(45) Date of Patent: Jul. 1, 2025

(54) VACUUM GLASS AND METHOD FOR MANUFACTURING SAME

(71) Applicant: Nippon Sheet Glass Company, Limited, Tokyo (JP)

(72) Inventors: Akito Takeuchi, Tokyo (JP); Tatsuhiro Nakazawa, Tokyo (JP); Tetsuo Minaai, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 643 days.

(21) Appl. No.: 17/273,456

(22) PCT Filed: Sep. 4, 2019

(86) PCT No.: PCT/JP2019/034727
§ 371 (c)(1),
(2) Date: Mar. 4, 2021

(87) PCT Pub. No.: WO2020/050302
PCT Pub. Date: Mar. 12, 2020

(65) Prior Publication Data
US 2022/0090438 A1    Mar. 24, 2022

(30) Foreign Application Priority Data

Sep. 5, 2018 (JP) .................. 2018-166297

(51) Int. Cl.
*E06B 3/66* (2006.01)
*C03C 27/08* (2006.01)
(Continued)

(52) U.S. Cl.
CPC .......... *E06B 3/66357* (2013.01); *C03C 27/08* (2013.01); *E06B 3/6612* (2013.01);
(Continued)

(58) Field of Classification Search
CPC ...... E06B 3/66; E06B 3/6612; E06B 3/66304; E06B 3/67; E06B 3/6715; E06B 3/677;
(Continued)

(56) References Cited

U.S. PATENT DOCUMENTS 3,842,567 A * 10/1974 Zwart ..................... E06B 3/677
                                                                     65/58
4,773,190 A *  9/1988 Reade .................. A01G 9/1415
                                                                   52/2.18
(Continued)

FOREIGN PATENT DOCUMENTS

CN          101402514 A    4/2009
CN          102050585 A    5/2011
(Continued)

OTHER PUBLICATIONS

International Search Report (PCT/ISA/210) issued in PCT/JP2019/034727, dated Dec. 3, 2019.
(Continued)

*Primary Examiner* — Z. Jim Yang
(74) *Attorney, Agent, or Firm* — Birch, Stewart, Kolasch & Birch, LLP

(57) ABSTRACT

High-strength vacuum glass is provided. The vacuum glass includes an air-cooled tempered first glass plate; an air-cooled tempered second glass plate that faces the first glass plate via a depressurized layer; and an outer peripheral sealing portion joining an outer peripheral edge portion of the first glass plate and an outer peripheral edge portion of the second glass plate together so as to seal the depressurized layer. The outer peripheral sealing portion contains solder.

3 Claims, 11 Drawing Sheets

(51) Int. Cl.
   *E06B 3/663* (2006.01)
   *E06B 3/673* (2006.01)
   *E06B 3/677* (2006.01)

(52) U.S. Cl.
   CPC ...... *E06B 3/66333* (2013.01); *E06B 3/67334* (2013.01); *E06B 3/6775* (2013.01)

(58) Field of Classification Search
   CPC . E06B 3/67334; E06B 3/6775; Y02A 30/249; Y02B 80/22
   See application file for complete search history.

(56) References Cited

U.S. PATENT DOCUMENTS

| | | | |
|---|---|---|---|
| 6,216,751 B1 * | 4/2001 | Trpkovski | E06B 3/6775 141/59 |
| 6,336,984 B1 * | 1/2002 | Aggas | C03C 23/007 65/114 |
| 6,365,242 B1 * | 4/2002 | Veerasamy | E06B 3/66333 52/786.13 |
| 6,793,990 B1 | 9/2004 | Sakaguchi et al. | |
| 7,204,102 B1 | 4/2007 | Eames et al. | |
| 2002/0194872 A1 | 12/2002 | Kato et al. | |
| 2007/0122588 A1 * | 5/2007 | Milburn | E06B 3/673 428/428 |
| 2009/0104071 A1 | 4/2009 | Yamada et al. | |
| 2012/0070624 A1 | 3/2012 | Payen et al. | |
| 2012/0321822 A1 | 12/2012 | Li | |
| 2013/0004685 A1 | 1/2013 | Li et al. | |
| 2013/0202820 A1 | 8/2013 | Li et al. | |
| 2015/0024151 A1 * | 1/2015 | Dai | C03C 27/10 65/41 |
| 2015/0218032 A1 * | 8/2015 | Hogan | C03C 8/02 65/33.2 |
| 2016/0298377 A1 * | 10/2016 | Kawashima | E06B 3/677 |
| 2017/0059749 A1 | 3/2017 | Wakatsuki et al. | |
| 2017/0328124 A1 * | 11/2017 | Abe | E06B 3/66304 |
| 2018/0009294 A1 | 1/2018 | Yamakawa et al. | |
| 2018/0238105 A1 * | 8/2018 | Vogel-Martin | B32B 17/06 |
| 2019/0177219 A1 * | 6/2019 | Karam | C03C 27/10 |
| 2020/0055282 A1 | 2/2020 | Oh et al. | |
| 2021/0131169 A1 * | 5/2021 | Shimizu | E06B 3/6612 |
| 2021/0309557 A1 * | 10/2021 | Gremmelspacher | C03B 23/0256 |

FOREIGN PATENT DOCUMENTS

| | | | | |
|---|---|---|---|---|
| CN | 102448750 A | 5/2012 | | |
| CN | 102701575 A | 10/2012 | | |
| CN | 102951800 A | 3/2013 | | |
| CN | 206217292 U | 6/2017 | | |
| CN | 107584833 A | 1/2018 | | |
| CN | 107814476 A | 3/2018 | | |
| CN | 1351578 A | 5/2022 | | |
| DE | 78 38 529 U1 | 3/1979 | | |
| EP | 1199289 A1 * | 4/2002 | ........... | E06B 3/6612 |
| GB | 2 415 989 A | 1/2006 | | |
| JP | 2000-119046 A | 4/2000 | | |
| JP | 2000-159552 A | 6/2000 | | |
| JP | 2002-326830 A | 11/2002 | | |
| JP | 2002-542138 A | 12/2002 | | |
| JP | 2005-231939 A | 9/2005 | | |
| JP | 2009-101415 A | 5/2009 | | |
| JP | 2013-512163 A | 4/2013 | | |
| JP | 2013-512164 A | 4/2013 | | |
| JP | 2013-512166 A | 4/2013 | | |
| JP | 2017-48110 A | 3/2017 | | |
| JP | 2018-66975 A | 4/2018 | | |
| WO | WO 00/58234 A1 | 10/2000 | | |
| WO | WO-2016084384 A1 * | 6/2016 | ............. | C03C 27/06 |
| WO | WO 2017/003663 A1 | 1/2017 | | |
| WO | WO-2017210701 A1 * | 12/2017 | ............. | C03C 27/08 |
| WO | WO 2018/066903 A1 | 4/2018 | | |

OTHER PUBLICATIONS

Written Opinion of the International Searching Authority (PCT/ISA/237) issued in PCT/JP2019/034727, dated Dec. 3, 2019.
Japanese Office Action for Japanese Application No. 2020-541259, dated May 9, 2023, with English translation.
Chinese Office Action and Search Report for Chinese Application No. 201980065790.2, dated Mar. 3, 2023, with English translation.
Chinese Office Action and Search Report dated Jun. 6, 2022 for Application No. 201980065790.2, with an English translation.
Extended European Search Report for European Application No. 19857572.2, dated May 3, 2022.
Chinese Office Action and Search Report for Chinese Application No. 201980065790.2, dated Jun. 27, 2023, with an English translation.

* cited by examiner

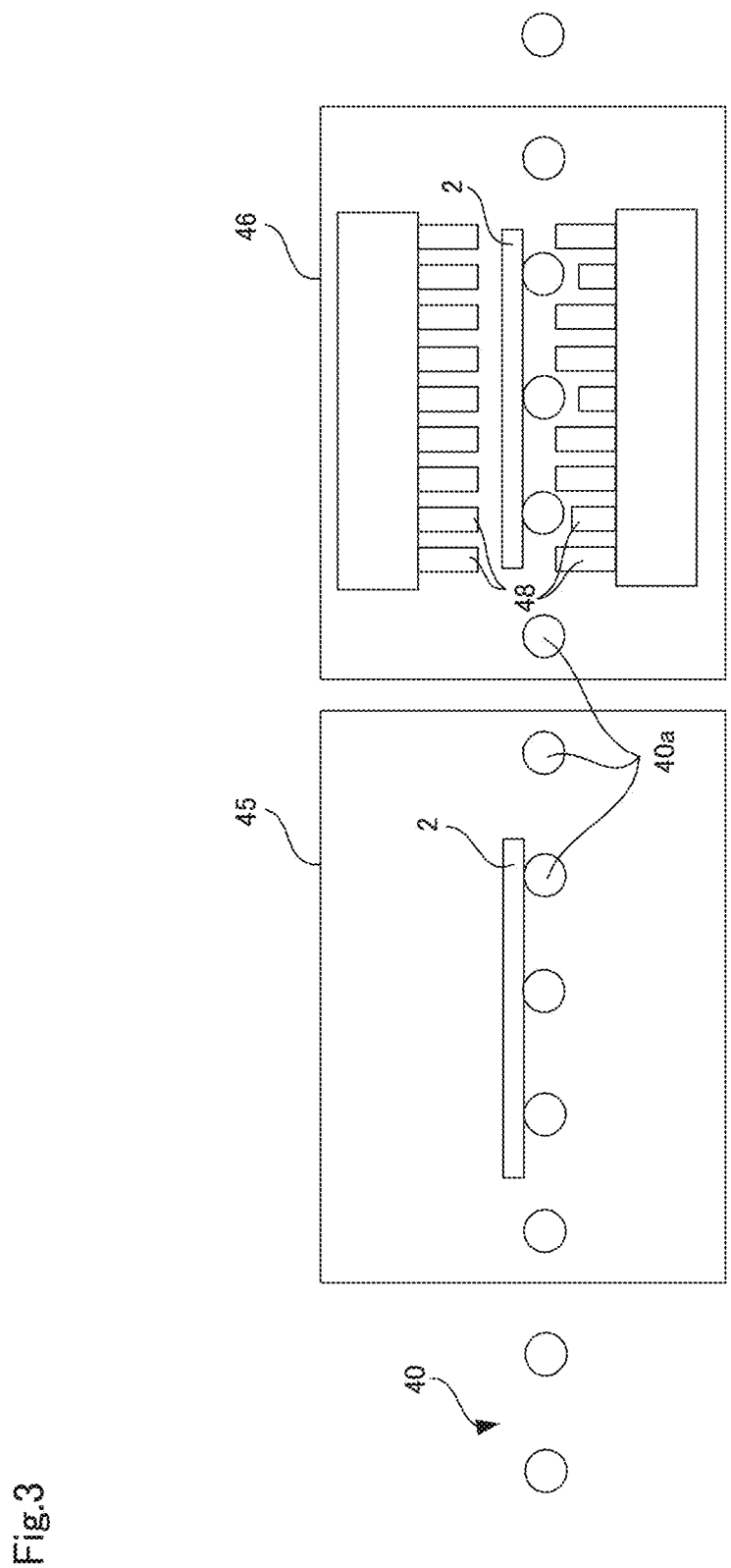

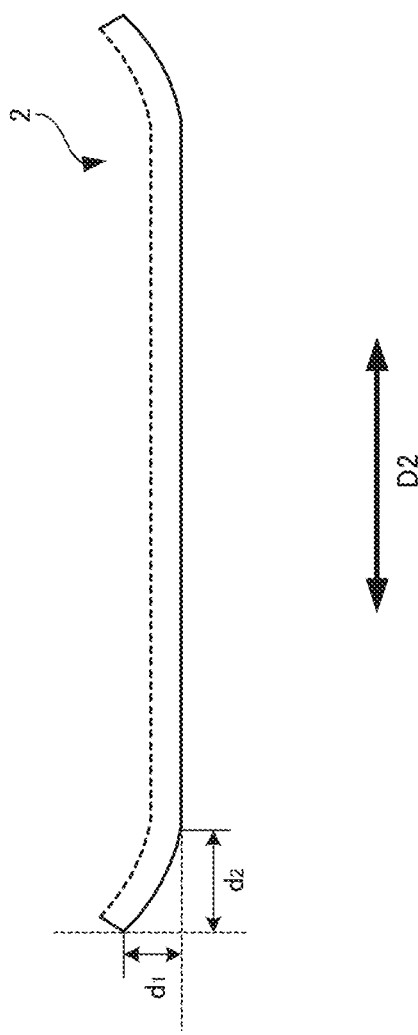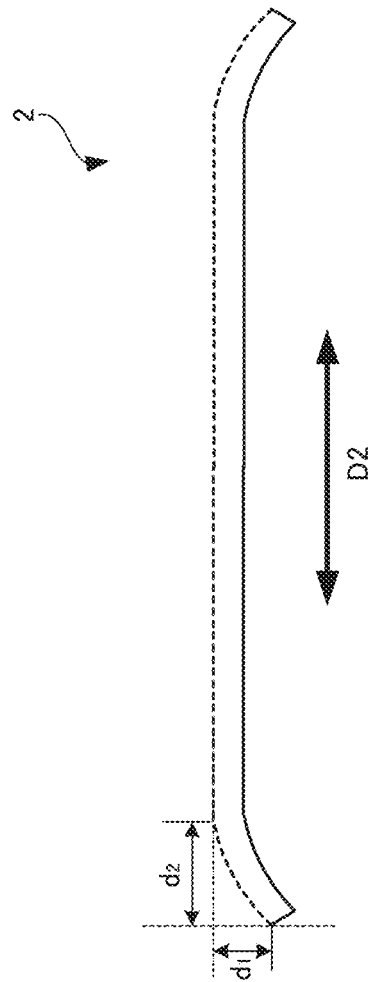
Fig.4A
Fig.4B

VACUUM GLASS AND METHOD FOR MANUFACTURING SAME

TECHNICAL FIELD

The present invention relates to vacuum glass and a method for manufacturing the same.

BACKGROUND ART

Double-glazed glass in which a depressurized layer is formed between two glass plates is also called vacuum glass, and has high heat-insulating properties. In order to secure the depressurized layer, outer peripheral edge portions of the two glass plates are sealed in a process for manufacturing vacuum glass. As disclosed in Patent Literature 1, typically, a sealing material used at this time is a glass frit. The outer peripheral edge portions are sealed by applying molten glass frit to the outer peripheral edge portions of the two glass plates, and then resolidifying the molten glass frit.

Incidentally, an air-cooled tempering method is one of methods for manufacturing high-strength glass plates called tempered glass. As disclosed in Patent Literature 2, the air-cooled tempering method is a method in which a glass plate is heated to a high temperature of about 600° C. to 700° C., and is rapidly cooled by blowing air onto the surface thereof. At this time, the strength of the glass plate is increased due to a compression layer being formed on the surface of the glass plate.

CITATION LIST

Patent Literature

Patent Literature 1: JP 2005-231939A
Patent Literature 2: JP 2017-48110A

SUMMARY OF INVENTION

Technical Problem

The inventors of the present invention studied the production of vacuum glass using an air-cooled tempered glass plate. However, at this time, when attempts are made to seal outer peripheral edge portions of two air-cooled tempered glass plates, using a glass frit, the strength of the glass plates, which has been increased through tempering through air cooling, decreases. This is because the melting point of the glass frit is still high even if a glass frit called a low-melting-point glass frit is used, and, when the outer peripheral edge portions are sealed, the glass plates are heated to a high temperature again by heat when melting the glass frit. Therefore, even if air-cooled tempered glass plates are used, it is ultimately difficult to manufacture high-strength vacuum glass.

It is an object of the present invention to provide high-strength vacuum glass.

Solution to Problem

Vacuum glass according to a first aspect of the present invention includes an air-cooled tempered first glass plate; an air-cooled tempered second glass plate that faces the first glass plate via a depressurized layer; and an outer peripheral sealing portion joining an outer peripheral edge portion of the first glass plate and an outer peripheral edge portion of the second glass plate together so as to seal the depressurized layer. The outer peripheral sealing portion contains solder.

Vacuum glass according to a second aspect of the present invention is the vacuum glass according to the first aspect, in which a principal surface of the first glass plate and a principal surface of the second glass plate have substantially the same area, and the first glass plate and the second glass plate are arranged such that edge surfaces that are wide in a thickness direction are generally flush with each other.

Vacuum glass according to a third aspect of the present invention is the vacuum glass according to the first or second aspect, in which the solder is lead-free solder.

Vacuum glass according to a fourth aspect of the present invention is the vacuum glass according to any of the first to third aspects, in which the first glass plate and the second glass plate each have a substantially rectangular shape that has two sides extending in a first direction and two sides extending in a second direction that is orthogonal to the first direction, when viewed in a direction that is orthogonal to principal surfaces thereof. The first glass plate and the second glass plate are respectively warped in the same direction at both ends thereof in the second direction when viewed in the first direction in a state in which no external force is applied.

Vacuum glass according to a fifth aspect of the present invention is the vacuum glass according to any of the first to third aspects, in which the first glass plate and the second glass plate each have a substantially rectangular shape that has two sides extending in a first direction and two sides extending in a second direction that is orthogonal to the first direction, when viewed in a direction that is orthogonal to principal surfaces thereof. The first glass plate and the second glass plate are warped to separate further from each other toward an outer side in the second direction at both ends in the second direction when viewed in the first direction in a state in which no external force is applied.

Vacuum glass according to a sixth aspect of the present invention is the vacuum glass according to any of the first to third aspects, in which the first glass plate and the second glass plate each have a substantially rectangular shape that has two sides extending in a first direction and two sides extending in a second direction that is orthogonal to the first direction, when viewed in a direction that is orthogonal to principal surfaces thereof. The first glass plate and the second glass plate are warped to approach closer to each other toward an outer side in the second direction at both ends in the second direction when viewed in the first direction in a state in which no external force is applied.

A method for manufacturing vacuum glass according to a seventh aspect of the present invention includes the following steps.
(1) A step of preparing a first glass plate and a second glass plate.
(2) A step of individually tempering the first glass plate and the second glass plate through air cooling.
(3) A step of opposing the first glass plate and the second glass plate to each other such that a space is formed therebetween, after the tempering through air cooling.
(4) A step of joining an outer peripheral edge portion of the first glass plate and an outer peripheral edge portion of the second glass plate together by solder so as to seal the space between the first glass plate and the second glass plate.
(5) A step of depressurizing the space between the first glass plate and the second glass plate through evacuation.

A method for manufacturing vacuum glass according to an eighth aspect of the present invention is the method for manufacturing vacuum glass according to the seventh aspect, in which the first glass plate and the second glass plate each have a substantially rectangular shape that has two sides extending in a first direction and two sides extending in a second direction that is orthogonal to the first direction, when viewed in a direction that is orthogonal to principal surfaces thereof. The first glass plate and the second glass plate that are opposed to each other in the step of opposing the first and second glass plates to each other are respectively warped in the same direction at both ends in the second direction when viewed in the first direction in a state in which no external force is applied.

A method for manufacturing vacuum glass according to a ninth aspect of the present invention is the method for manufacturing vacuum glass according to the seventh aspect, in which the first glass plate and the second glass plate each have a substantially rectangular shape that has two sides extending in a first direction and two sides extending in a second direction that is orthogonal to the first direction, when viewed in a direction that is orthogonal to principal surfaces thereof. The first glass plate and the second glass plate that are opposed to each other in the step of opposing the first and second glass plates to each other are warped to separate further from each other toward an outer side in the second direction at both ends in the second direction when viewed in the first direction in a state in which no external force is applied.

A method for manufacturing vacuum glass according to a tenth aspect of the present invention is the method for manufacturing vacuum glass according to the seventh aspect, in which the first glass plate and the second glass plate each have a substantially rectangular shape that has two sides extending in a first direction and two sides extending in a second direction that is orthogonal to the first direction, when viewed in a direction that is orthogonal to principal surfaces thereof. The first glass plate and the second glass plate that are opposed to each other in the step of opposing the first and second glass plates to each other are warped to approach closer to each other toward an outer side in the second direction at both ends in the second direction when viewed in the first direction in a state in which no external force is applied.

Advantageous Effects of Invention

According to the above-described aspects of the present invention, the outer peripheral edge portions of two air-cooled tempered glass plates are sealed by solder. Accordingly, the outer peripheral edge portions of the glass plates can be sealed in a low-temperature environment, and the air-cooled tempered glass plates will not be reheated excessively. Therefore, a decrease in the strength of the air-cooled tempered glass plates is suppressed, and high-strength vacuum glass can be provided.

BRIEF DESCRIPTION OF DRAWINGS

FIG. 3 is a schematic diagram of equipment for performing tempering through air cooling.

FIG. 4A is a diagram illustrating a form of warpage of an air-cooled tempered glass plate.

FIG. 4B is a diagram illustrating another form of warpage of an air-cooled tempered glass plate.

DESCRIPTION OF EMBODIMENTS

Hereinafter, vacuum glass according to an embodiment of the present invention and a method for manufacturing the same will be described with reference to the drawings.

1. Overall Configuration of Vacuum Glass

Figure 1:
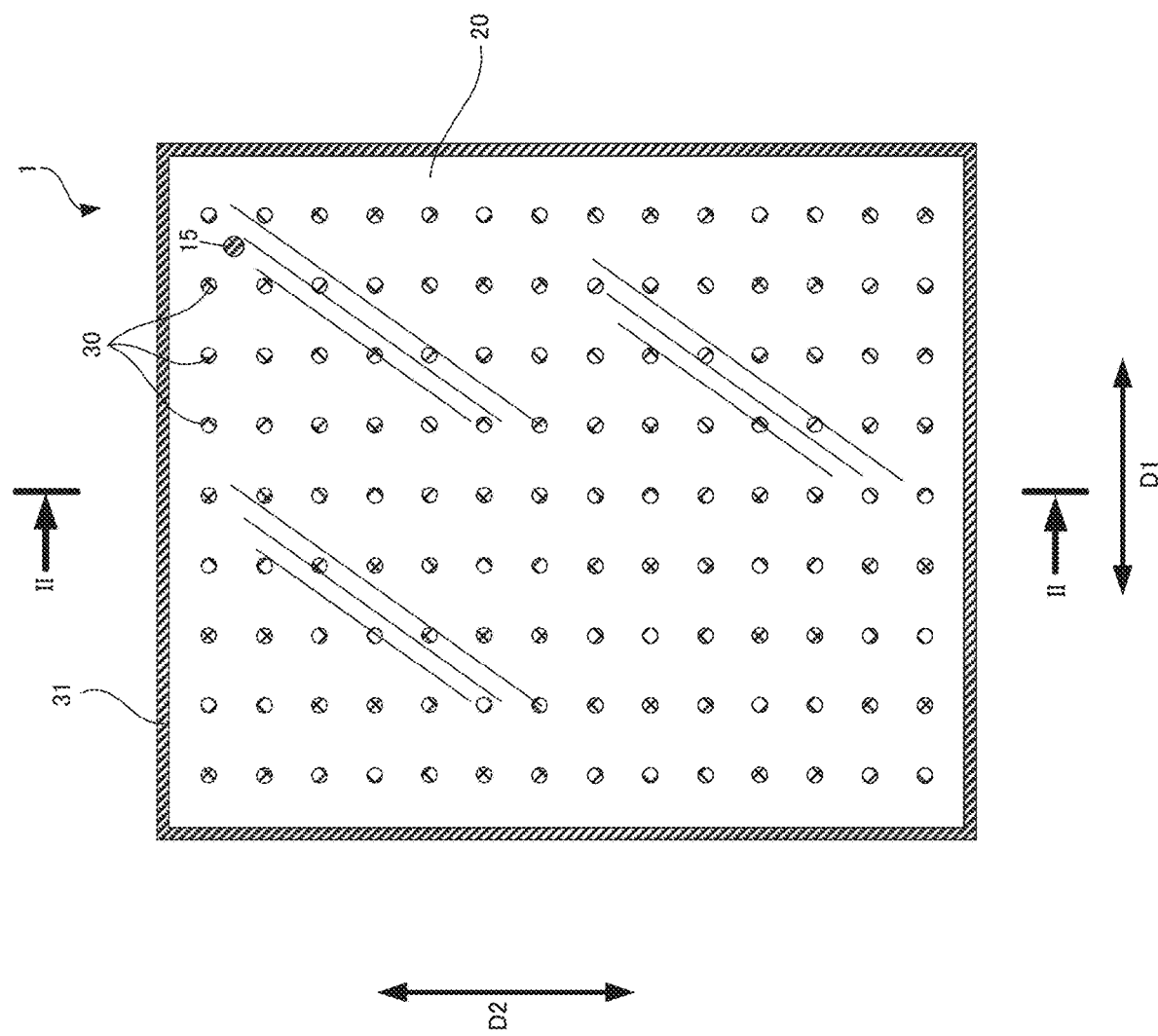
FIG. 1 is a front view of vacuum glass according to an embodiment of the present invention.
Figure 2:
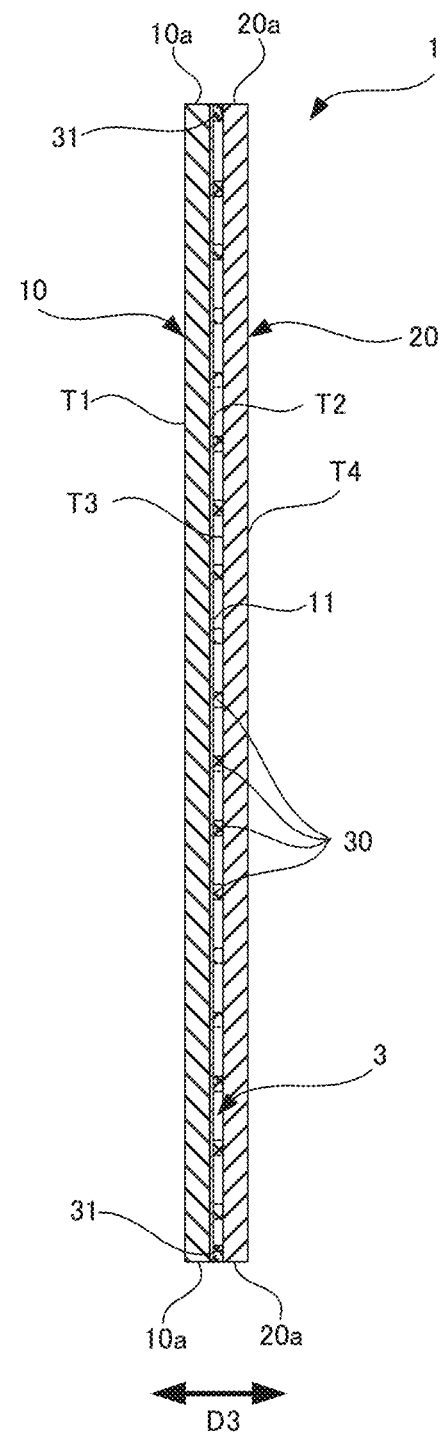
FIG. 2 is a cross-sectional view taken along line II-II in FIG. 1.

FIG. 1 is a front view of vacuum glass 1 according to an embodiment of the present invention, and FIG. 2 is a lateral cross-sectional view thereof. There is no particular limitation on the application of the vacuum glass 1, but the vacuum glass 1 of this embodiment is used as a building material such as window glass or door glass in a building. As shown in FIGS. 1 and 2, the vacuum glass 1 is a glass structure including two glass plates 10 and 20. The glass plates 10 and 20 are disposed such that they face each other via a depressurized layer 3 and their principal surfaces extend in parallel with each other. In the description below, a side face (principal surface) of the glass plate 10 (may also be referred to as a "first glass plate 10 hereinafter) that faces the outer side is referred to as a "first surface T1", and a side face (principal surface) of the first glass plate 10 that faces the inner side (the depressurized layer 3 side) is referred to as a "second surface T2". Also, aside face (principal surface) of the glass plate 20 (may also be referred to as a "second glass plate 20 hereinafter) that faces the inner side (the depressurized layer 3 side) is referred to as a "third surface T3", and a side face (principal surface) of the second glass plate 20 that faces the outer side is referred to as a "fourth surface T4". Note that, if the vacuum glass 1 is installed in a building, the first glass plate 10 is disposed on the outdoor side, and the second glass plate 20 is disposed on the indoor side, although there is no particular limitation thereto.

The first glass plate 10 and the second glass plate 20 each have a substantially rectangular shape that has two sides extending in a first direction D1, and two sides extending in a second direction D2 that is orthogonal thereto, in a front view. A "front view" refers to the glass plates 10 and 20 being viewed in a direction that is orthogonal to the principal surfaces thereof. The first direction D1 corresponds to the right-left direction in FIG. 1, and the second direction D2 corresponds to the up-down direction in FIG. 1.

The principal surface of the first glass plate 10 and the principal surface of the second glass plate 20 have substantially the same area, and the first glass plate 10 and the second glass plate 20 are disposed such that edge surfaces 10a and 20a thereof that are wide in a thickness direction D3 are generally flush with each other. The "thickness direction D3" refers to a direction (the lateral direction in FIG. 2) that is orthogonal to the principal surfaces T1 to T4 of the glass plates 10 and 20. The edge surface 10a extends between an outer peripheral edge of the first surface T1 and an outer peripheral edge of the second surface T2 to connect these outer peripheral edges to each other, and the edge surface 20a extends between an outer peripheral edge of the third surface T3 and an outer peripheral edge of the fourth surface T4 to connect these outer peripheral edges to each other.

Multiple spacers 30 having substantially the same thickness are disposed on the second surface T2 and the third surface T3 of the first glass plate 10 and the second glass plate 20 that face the inner side between the first glass plate 10 and the second glass plate 20. The spacers 30 are arranged at positions that correspond to the vertices of a grid in a front view at regular intervals in the first direction D1 and the second direction D2. The arrangement interval of the spacers 30 is preferably 5 to 100 mm, more preferably 5 to 80 mm, and even more preferably 5 to 60 mm. Also, due to these spacers 30, the depressurized layer 3 having a uniform thickness, which corresponds to the thickness of the spacers 30, is secured between the second surface T2 (more precisely, a low-emissivity film 11, which will be described later) of the first glass plate 10 and the third surface T3 of the second glass plate 20. The depressurized layer 3 is depressurized to a pressure lower than the standard atmospheric pressure, typically 1.33 Pa or lower, and is also referred to as a "vacuum layer". The depressurized layer 3 that is in a substantially vacuum state as described above suppresses heat transfer and heat convection between the outdoor side and the indoor side of the vacuum glass 1, and thus heat on the indoor side is not released to the outdoor side, and high heat insulation properties are imparted to the vacuum glass 1.

The first glass plate 10 of this embodiment is a Low-E glass plate, and a low-emissivity film (Low-E film) 11 is layered on the substantially entire second surface T2. The low-emissivity film 11 suppresses heat emission and thus contributes to a further improvement in the heat insulation properties of the vacuum glass 1. In view of high performance of the low-emissivity film 11 to be formed, it is preferable to select a sputtering method as a method for forming the low-emissivity film 11. However, there is no limitation thereto, and it is also possible to select a CVD (chemical vapor deposition) method, for example.

Also, an outer peripheral sealing portion 31 is disposed along the entire outer peripheral edge portions of the first glass plate 10 and the second glass plate 20 between the two glass plates 10 and 20. The outer peripheral sealing portion 31 is a member for maintaining a substantially vacuum state of the depressurized layer 3, and joining the outer peripheral edge portion of the first glass plate 10 and the outer peripheral edge portion of the second glass plate 20 together so as to seal the depressurized layer 3 located between the two glass plates 10 and 20. The outer peripheral sealing portion 31 is mainly composed of solder, and is made of metal. The liquidus temperature of solder used here is preferably 300° C. or lower, more preferably 250° C. or lower, and even more preferably 200° C. or lower. Here, the "liquidus temperature" refers to the temperature at which solder is completely molten, and can be measured through differential scanning calorimetry (DSC), for example.

As described above, the outer peripheral sealing portion 31 of this embodiment contains solder. The outer peripheral sealing portion 31 may further include a protective film for protecting the solder. The protective film is made of resin, for example. The solder is preferably lead-free solder. It is possible to use lead-free solder containing Sn and Zn, for example. Also, lead-free solder preferably contains at least one of Ag, Ti, and Al. The Sn content is preferably 90.0% or higher. The Zn content preferably ranges from 0.001% to 10%. Also, the Ag content preferably ranges from 0% to 6.0%, and more preferably ranges from 0% to 3.5%. The Ti content preferably ranges from 0% to 3.0%. The Al content preferably ranges from 0% to 3.0%, and more preferably ranges from 0% to 1.0%. The lead-free solder preferably contains at least one of Bi, Si, and Sb in a total content of 10% or less. Also, the Si content preferably ranges from 0% to 1.0%, and more preferably ranges from 0% to 0.1%. Also, the lead-free solder preferably contains In. The lead-free solder preferably contains at least one of Fe, Ni, Co, Ga, Ge, and P, and the total content thereof is preferably 1.0% or lower.

The first glass plate 10 and the second glass plate 20 are both glass tempered through air cooling, and are obtained by tempering a float glass plate through air cooling in this embodiment. That is, the glass plates 10 and 20 are manufactured by heating a float glass plate to a high temperature of about 600° C. to 700° C., and rapidly cooling the heated glass plate by blowing air onto the surface thereof. Accordingly, a compressive force is generated on the surfaces of the glass plates 10 and 20, and a tensile force is generated inside the glass plates, as a result of which the strength of the glass plates 10 and 20 is increased. Note that, typically, glass in which the number of fragments is 40 or more in a 50 mm×50 mm square region when a crushing test is performed based on JIS (Japanese Industrial Standards) R3206 can be called tempered glass, although there is no limitation thereto.

Figure 9A:
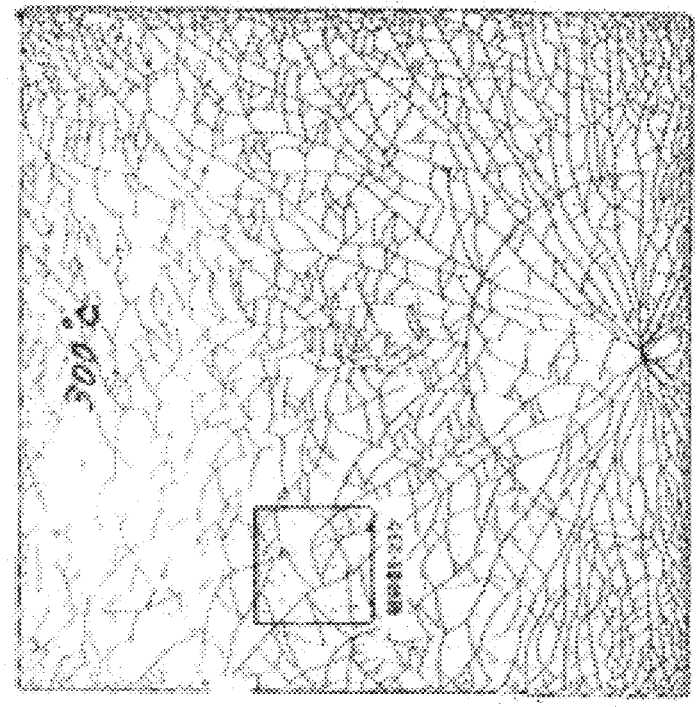
FIG. 9A is a diagram showing results obtained by performing a crushing test after an air-cooled tempered glass plate was heated to 300° C.
Figure 9B:
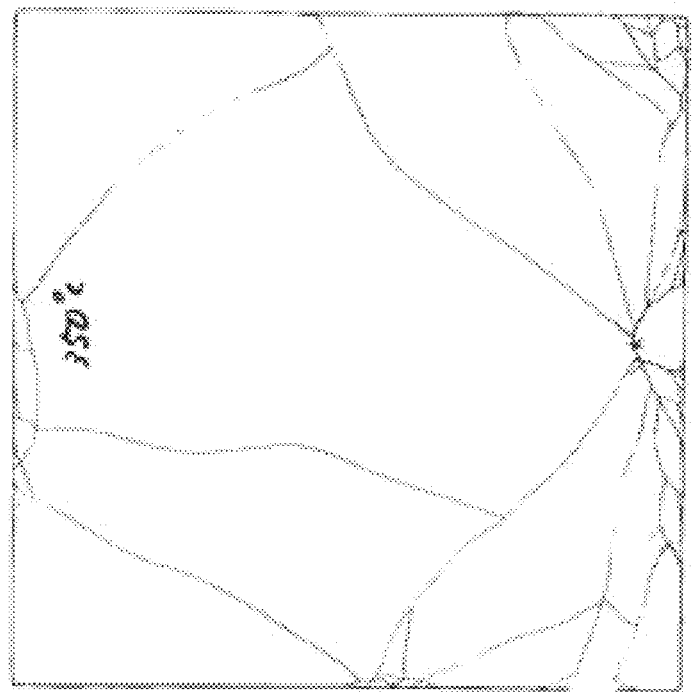
FIG. 9B is a diagram showing results obtained by performing a crushing test after an air-cooled tempered glass plate was heated to 350° C.

FIGS. 9A and 9B show results of crushing tests performed on samples obtained by heat-treating a glass plate (TP3), which is made of Nippon Sheet Glass Co., Ltd. and is tempered through air cooling, at two temperatures. As a heat treatment at this time, treatment was carried out in which the space in which the sample was disposed was heated such that the temperature thereof is increased at a rate of 10° C./min starting from room temperature, the temperature was maintained at 1° C. for 30 minutes, and the space was then allowed to cool and returned to room temperature. The size of the samples was 300 mm×300 mm×3 mm. FIG. 9A shows the results at T=300° C., and FIG. 9B shows the results at T=350° C. It was found from FIGS. 9A and 9B, the degree of tempering softening when an air-cooled tempered glass plate was heated to 300° C. was very small compared with that in a case where an air-cooled tempered glass plate was heated to 350° C.

Figure 10B:
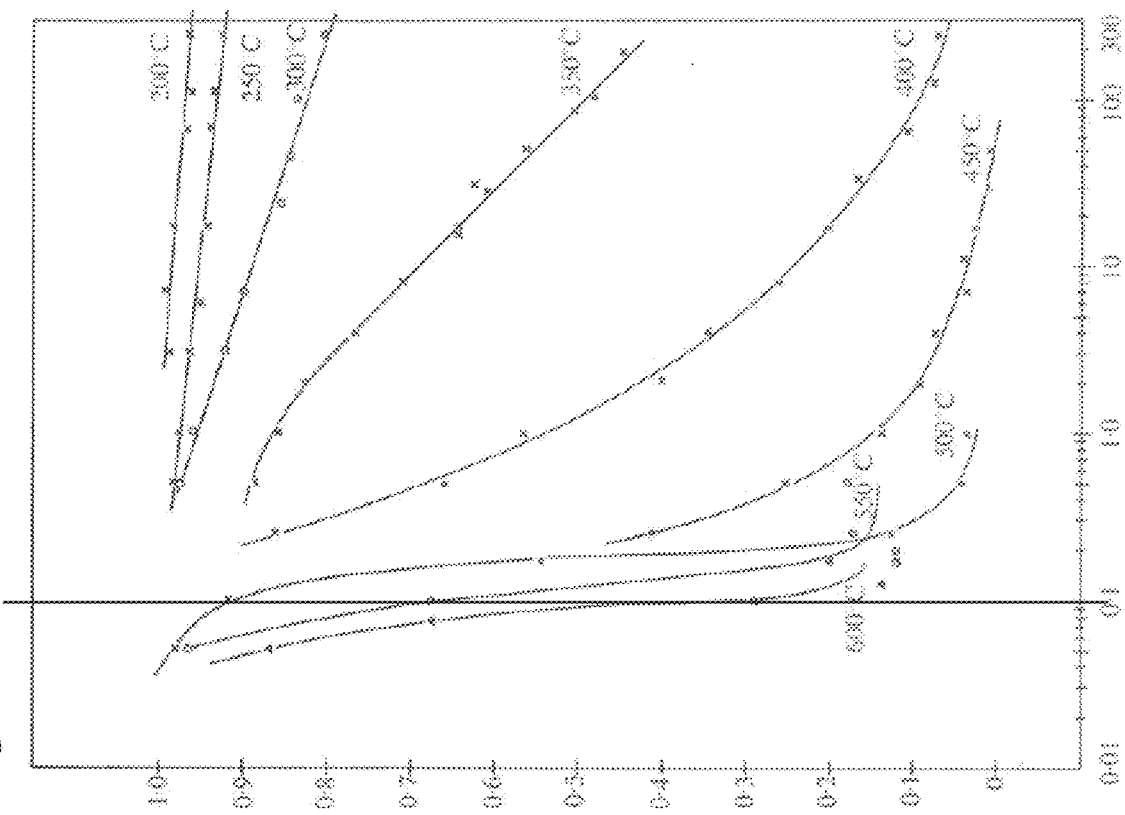
FIG. 10B is a diagram showing the relationship between tempering softening of a tempered glass plate with a thickness of 9.5 mm and the heating time for various heating temperatures.
Figure 10A:
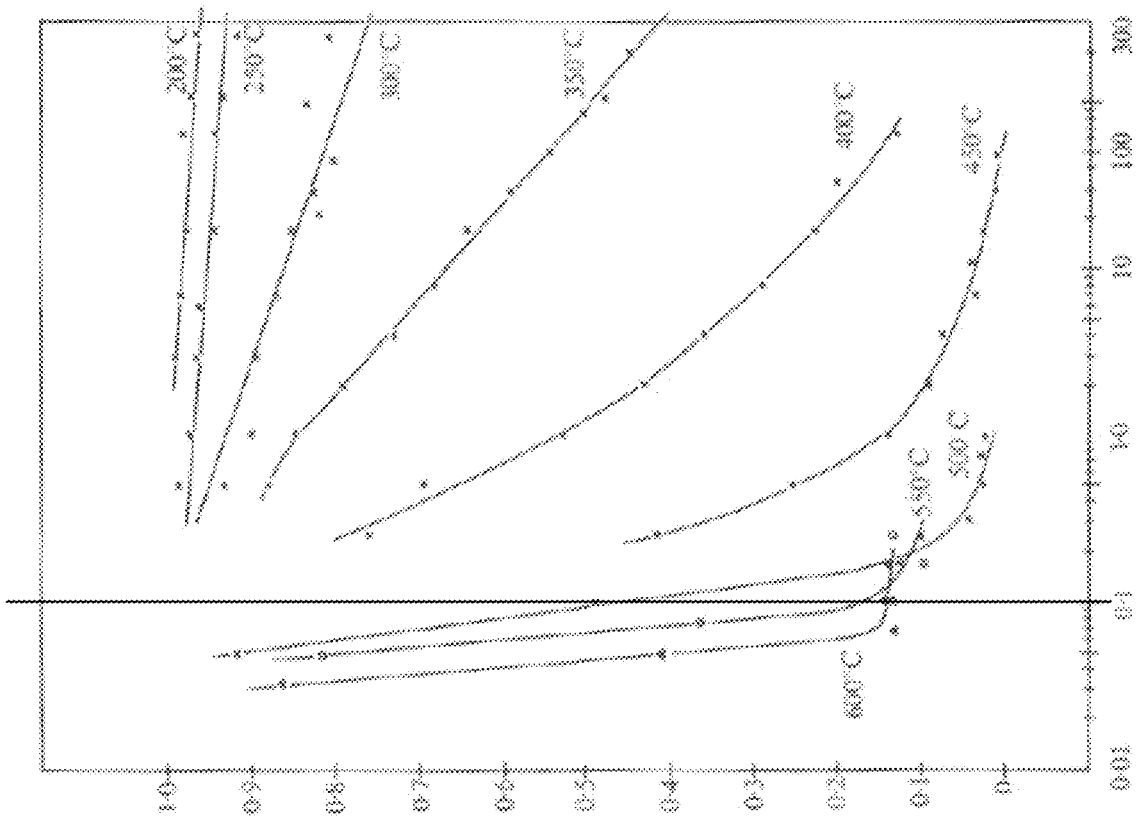
FIG. 10A is a diagram showing the relationship between tempering softening of a tempered glass plate with a thickness of 4.6 mm and the heating time for various heating temperatures.

FIGS. 10A and 10B show graphs in a paper ("Stress relaxation in toughened glass", "Glass Technology", vol. 18, No. 5, p. 148 to 151, October 1977) published by Novotny. V, and Kavka. J. However, a line extending along 0.1 on the horizontal axis was added by the applicant for descriptive purposes. FIGS. 10A and 10B are graphs showing progression of tempering softening at various heating temperatures with regard to tempered glass plates respectively having thicknesses of 4.6 mm and 9.5 mm. The horizontal axis indicates the heating time (time), and the vertical axis indicates a proportion (referred to as a "stress proportion" hereinafter) of the current stress to the initial stress. The smaller the stress proportion on the vertical axis is, the greater the degree of tempering softening is. These graphs indicate that, if the heating time is about 0.1 hours, for example, tempering softening does not occur in the case where the heating temperature is 300° C. or lower. On the other hand, the graphs indicate that, even if the heating time is about 0.1 hours, tempering softening may occur, if the heating temperature is 500° C. or higher, such as the melting point of a conventional sealing material for sealing outer peripheral edge portions of glass plates.

According to the above-description, it was confirmed that the liquidus temperature of solder used in the outer peripheral sealing portion 31 is preferably 300° C. or lower. In this case, the outer peripheral edge portions of the glass plates 10 and 20 can be sealed at a temperature of 300° C. or lower, and it is possible to effectively suppress a decrease in the strength of the air-cooled tempered glass plates 10 and 20, due to the glass plates 10 and 20 not being reheated excessively.

The thicknesses (average thicknesses are used when the thicknesses are not uniform) of the first glass plate 10, the second glass plate 20, the depressurized layer 3, and the low-emissivity film 11 are given as d1, d2, d3, and d4, respectively. The values of d1 to d4 can be selected as appropriate in accordance with the application, and d1 is preferably 0.3 mm or more and 15 mm or less, more preferably 0.5 mm or more and 12 mm or less, and even more preferably 1 mm or more and 10 mm or less. The same applies to d2, and d1 and d2 may be the same or different. d3 is preferably 0.03 mm or more and 1 mm or less, more preferably 0.05 mm or more and 0.5 mm or less, and even more preferably 0.1 mm or more and 0.3 mm or less. d4 is preferably 50 nm or more and 600 nm or less, more preferably 50 nm or more and 500 nm or less, and even more preferably 50 nm or more and 400 nm or less. When d1 to d4 satisfy the numerical ranges described above, the heat insulation properties can be readily improved while reducing the thickness of the vacuum glass 1.

As shown in FIG. 1, a through-hole 15 is formed in the vicinity of one corner of the second glass plate 20. The through-hole 15 is sealed by a sealing material. The through-hole 15 is used to evacuate the space present between the glass plates 10 and 20 in order to form the depressurized layer 3, and then is sealed. Solder can be used as a sealing material for sealing the through-hole 15, for example, and it is preferable to use lead-free solder at this time. Note that the through-hole 15 may be formed in the first glass plate 10.

2. Manufacturing Method

Next, a method for manufacturing the vacuum glass 1 will be described below. First, a float glass plate 2 is prepared which has been cut into a predetermined shape and is to be ultimately processed into the first glass plate 10 and the second glass plate 20. Here, two types of float glass plates 2 are prepared, and one of the float glass plates 2 (may be indicated by reference numeral 2a hereinafter) is provided with the low-emissivity film 11 on one principal surface thereof, and ultimately forms the first glass plate 10. The other float glass plate 2 (may be indicated by reference numeral 2b hereinafter) is not provided with the low-emissivity film 11, with the surface of the glass being left exposed, and ultimately forms the second glass plate 20. Also, the float glass plate 2b is provided with the through-hole 15 for evacuation.

Then, these float glass plates 2 are tempered through air cooling. FIG. 3 is a schematic diagram of equipment for performing tempering through air cooling. The float glass plates 2 are conveyed on a roller conveyor 40 that includes multiple rollers 40a. At this time, the float glass plate 2a is placed on the roller conveyor 40 with the low-emissivity film 11 facing upward. The float glass plates 2 are first introduced into a heating furnace 45 on the roller conveyor 40, where the float glass plates 2 are exposed under a high temperature environment for a predetermined time and heated to about 600° C. to 700° C. Thereafter, the float glass plates 2 heated to a high temperature in this manner are introduced into a cooling furnace 46 on the roller conveyor 40. In the cooling furnace 46, air is blown onto the surfaces of the float glass plates 2 on the roller conveyor 40 from the upper side and the lower side thereof via a nozzle 48 for a predetermined time, and the float glass plates 2 are rapidly cooled. Accordingly, a compressive force is generated on the surfaces of the float glass plates 2, and a tensile force is generated inside the float glass plates 2, as a result of which the strength of the float glass plates 2 is increased. Note that, in this embodiment, the roller conveyor 40 reciprocates the float glass plates 2 inside the heating furnace 45 and the cooling furnace 46 respectively while the float glass plates 2 are heated and cooled.

As shown in FIG. 2, the glass plates 10 and 20 included in the vacuum glass 1 both have a substantially flat plate shape. However, as shown in FIGS. 4A and 4B, each float glass plate 2 tempered through air cooling as described above has a shape in which both ends thereof in the second direction D2 when viewed in the first direction D1 are warped, in a state in which no external force is applied. That is, both ends of the glass plate 2 are warped through heating and rapid cooling processes. Note that, if tempering through air cooling is performed in equipment such as described above, directionality of the warpage depends on the conveyance direction of the roller conveyor 40, with the direction that is parallel to the conveyance direction being the second direction D2, and the first direction D1 being orthogonal to the conveyance direction.

Also, if tempering through air cooling is performed in equipment such as described above, dirt is less likely to adhere to a surface (upper surface in FIG. 3) of the float glass plate 2 that is not in contact with the rollers 40a, compared to a surface (lower surface in FIG. 3) of the float glass plate 2 that is in contact with the rollers 40a. Typically, "dirt" here refers to organic dirt such as oil. In FIGS. 4A and 4B, the surface of the float glass plate 2 indicated by dotted lines is a surface that is not in contact with the rollers 40a. According to the studies conducted by the inventors of the present invention, the glass plate 2 is likely to warp in the same direction mainly at both ends thereof in the second direction D2. In FIG. 4A, when the surface that is not in contact with the rollers 40a is the upper surface, both ends thereof in the second direction D2 are warped upward, and in FIG. 4B, when the surface that is not contact with the rollers 40a is the upper surface, both ends thereof in the second direction D2 are warped downward. Which type of glass plate 2 is to be manufactured is likely to depend on the specifications of the glass plate 2 and facilities for tempering through air cooling (the size of the glass plate 2, the size and the intervals of the rollers 40a, for example), and the like.

Figure 5:
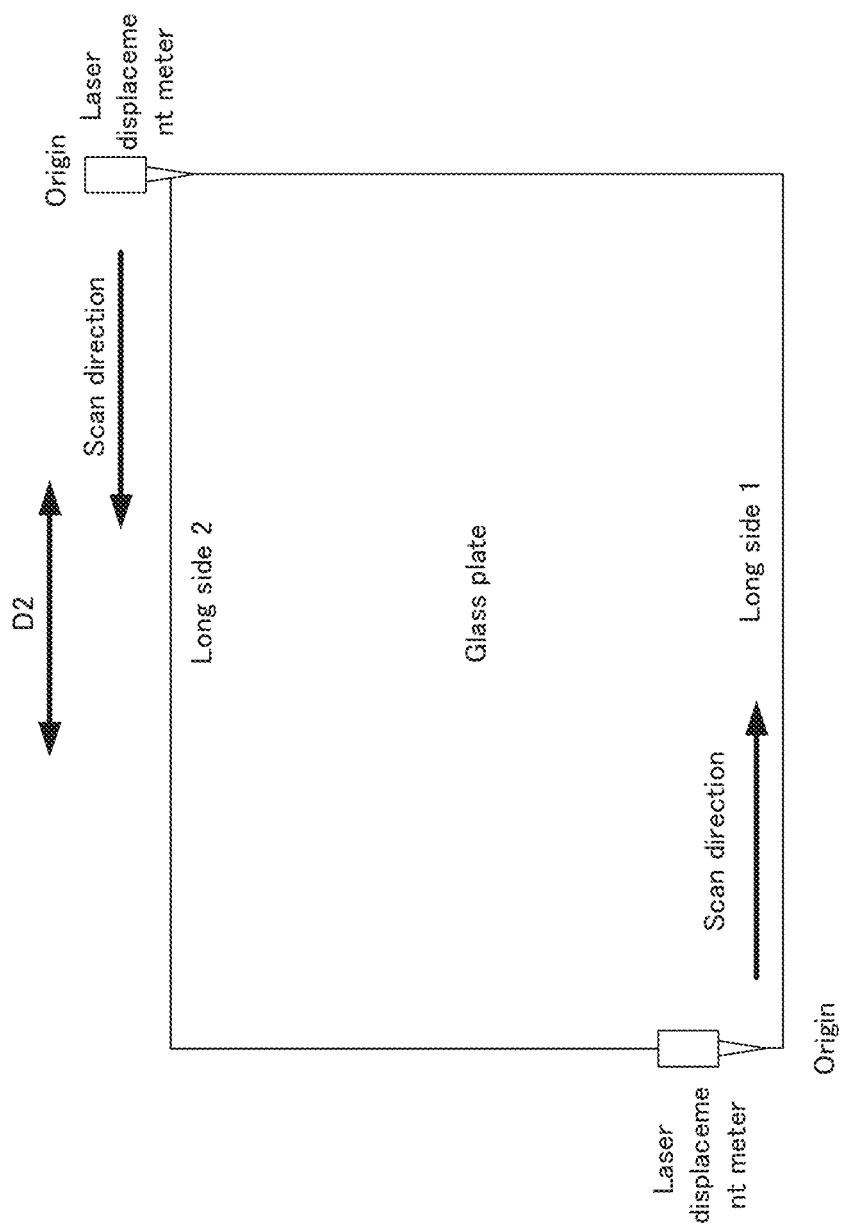
FIG. 5 is a diagram illustrating a method for measuring the shape of warpage of both ends of a glass plate.

The inventors of the present invention confirmed the above-described tendency through experiments. The inventors of the present invention manufactured ten float glass plates tempered through air cooling using the above-described method in the same equipment for tempering through air cooling, and measured the shape of warpage of both ends of these glass plates. The shape of warpage of both ends thereof was measured as follows. FIG. 5 is a diagram illustrating a method for measuring the shape of warpage of both ends thereof. A glass plate was placed on a metal surface plate with a surface thereof that is not in contact with the rollers facing upward. Then, rails were installed which run along two sides that extend in the second direction D2 of the glass plate, and scanning was performed using a laser displacement meter (LK-G30 manufactured by KEYENCE CORPORATION) along the rails in parallel to the same two sides. The origins of measurement and the scan directions are shown in FIG. 5. The origins were aligned at edges of the glass plate with respect to the scan directions, and, in the direction perpendicular to the scan directions, the origins were set to 5 mm inward from the edges of the glass plate to avoid measurement errors that occur if the origins are located on the edges. The length of the glass plate in the second direction D2 was 900 mm. The measurement pitch was set to 20 mm, and measurement points were located 5 mm, 25 mm, 45 mm, . . . , 865 mm, 885 mm, and 895 mm from the origins. Scanning was performed using a laser displacement meter from above the glass plate, a distance $d_0$ between the metal surface plate and the displacement meter at each origin was measured, and a distance d from the laser displacement meter to an upper surface of the glass plate was measured at each measurement point while moving the laser displacement meter. Also, a thickness h of the glass plate was measured separately. The thickness h was obtained by measuring thicknesses of the glass plate at the four corners thereof and averaging the measured thicknesses. Then, the amount of displacement (the distance between the metal surface plate and the lower surface of the glass plate) $d_g$ was calculated as $d_g=d_0-(h+d)$.

Figure 6A:
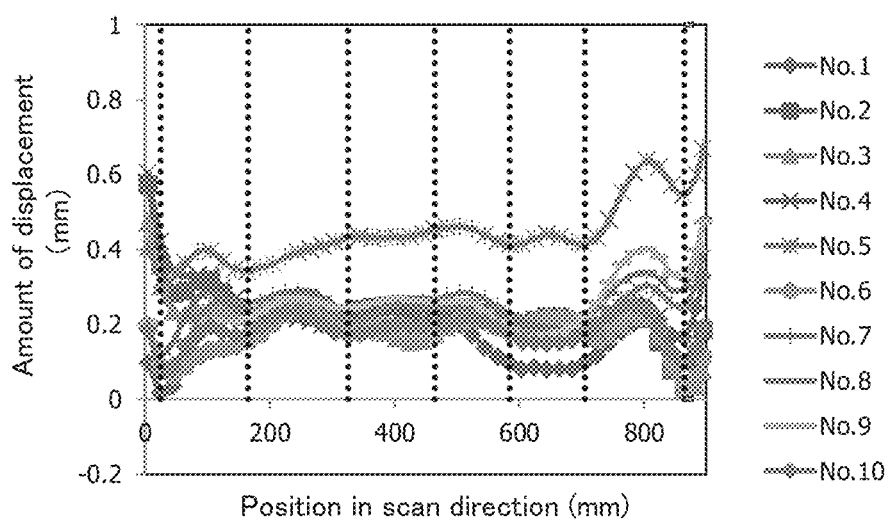
FIG. 6A shows a graph obtained by measuring the shape of warpage of both ends of long sides 1 of ten glass plates.
Figure 6B:
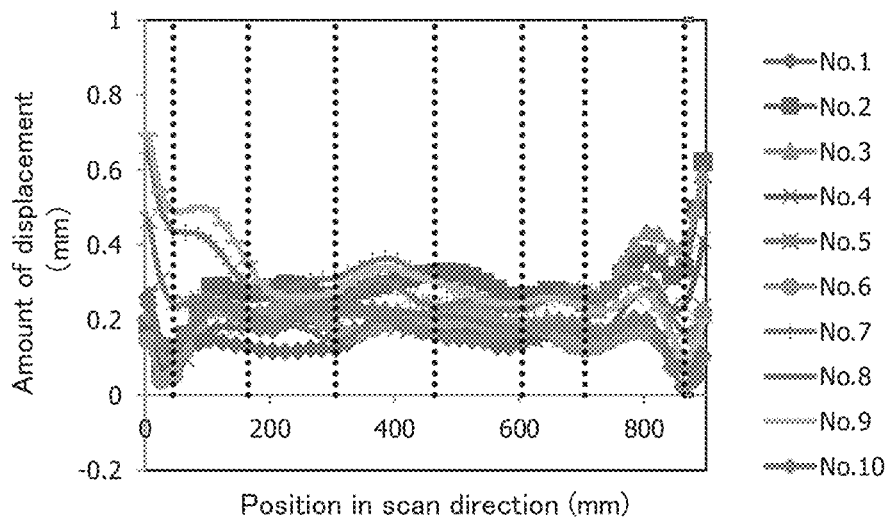
FIG. 6B shows a graph obtained by measuring the shape of warpage of both ends of long sides 2 of the same ten glass plates as in FIG. 6A.

The results of measurement of the shape of warpage of both ends thereof based on the amount of displacement $d_g$ are shown in FIGS. 6A and 6B. FIG. 6A is a graph obtained by measuring the amount of displacement $d_g$ of one side (long side 1 in FIG. 5) extending along the second direction D2 of ten glass plates having a low-E film, and FIG. 6B is a graph obtained by measuring the amount of displacement $d_g$ of another side (long side 2 in FIG. 5) extending along the second direction D2 of the same glass plates. With the ten glass plates corresponding to FIGS. 6A and 6B, the type shown in FIG. 4A was confirmed, that is, the tendency for both ends thereof in the second direction D2 to warp upward. Note that the inventors of the present invention also confirmed that the tendency of warpage such as illustrated in FIG. 4B appears depending on the conditions of air-cooled tempering. Also, although the verification was performed using glass plates having a Low-E film here, it was also confirmed that, even if normal float glass plates that do not have a Low-E film are used, the tendency of warpage such as shown in FIGS. 4A and 4B appears.

Figure 11B:
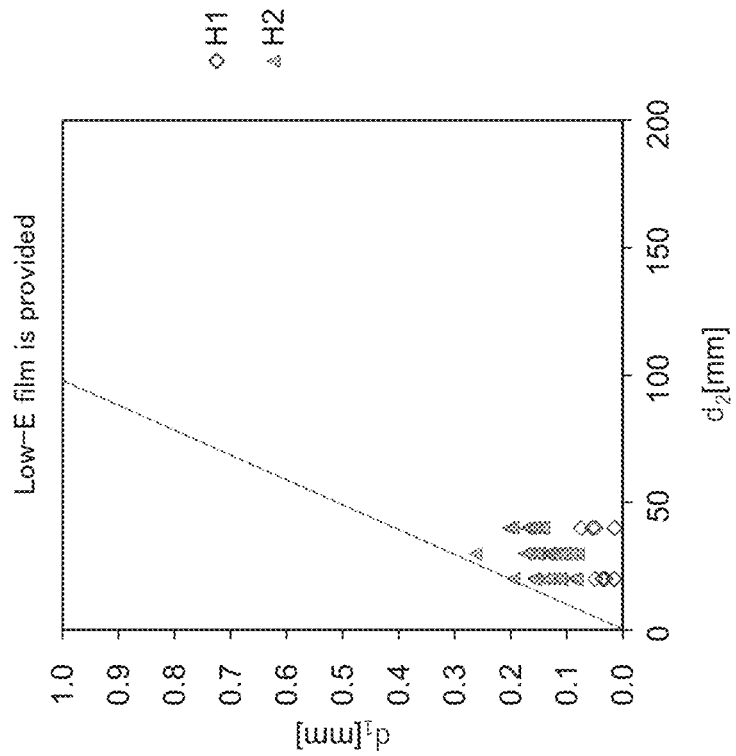
FIG. 11B shows a graph showing results obtained by measuring the amount of warpage of end portions of two tempered glass plates that have a Low-E film.
Figure 11A:
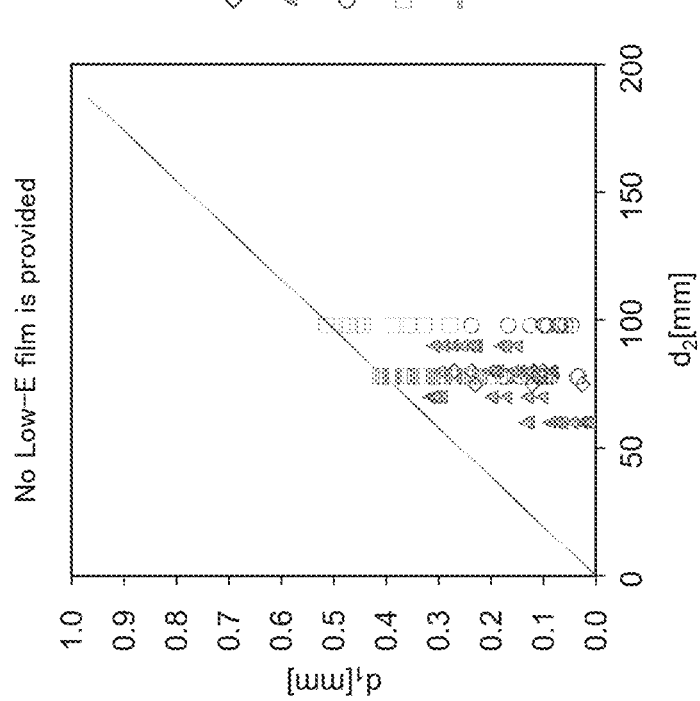
FIG. 11A shows a graph showing results obtained by measuring the amount of warpage of end portions of five tempered glass plates that do not have a Low-E film.

FIG. 11A shows the results of measurement of a warpage amount $d_1$ of end portions of five tempered glass plates G1 to G5 that did not have Low-E films, and FIG. 11B shows the results of measurement of the warpage amount $d_1$ of end portions of two tempered glass plates H1 and H2 having Low-E films. The tempered glass plates G1 to G5, and H1 and H2 are all float glass plates, and have been tempered through heating at 700° C. for 5 minutes and air cooling the heated glass plates. The Low-E films of the tempered glass plates H1 and H2 have a thickness of about 85 nm. The sizes of the tempered glass plates G1 to G5, H1, and H2 are as follows.

TABLE 1

|    | Low-E Film | Length in D1 Direction [mm] | Length in D2 Direction [mm] | Thickness in D3 Direction [mm] |
|----|------------|------------------------------|------------------------------|--------------------------------|
| G1 | No         | 609.6                        | 863.6                        | 3.9                            |
| G2 | No         | 600                          | 900                          | 3.1                            |
| G3 | No         | 600                          | 900                          | 3.9                            |
| G4 | No         | 600                          | 900                          | 3.1                            |
| G5 | No         | 600                          | 900                          | 3.1                            |
| H1 | Yes        | 609.6                        | 863.6                        | 3.9                            |
| H2 | Yes        | 600                          | 900                          | 3.1                            |

In the experiments in FIGS. 11A and 11B, a warpage start position $d_2$ from an end portion of a glass plate was also measured together with the warpage amount $d_1$ of the end portion of the glass plate. FIGS. 11A and 11B are graphs that plot the relationship between the warpage amount $d_1$ and the warpage start position $d_2$. $d_1$ and $d_2$ are defined as shown in FIGS. 4A and 4B, and were measured using the measuring device described with reference to FIG. 5. More specifically, the glass plate was placed on the metal surface plate, the rails extending in the second direction D2 were prepared, the distance d from the laser displacement meter to the upper surface of the glass plate was measured at each measurement point at a measurement pitch of 20 mm while moving the laser displacement meter (LK-G30 manufactured by KEYENCE CORPORATION) in the second direction D2 along the rails. Note that the measurement pitch in the second direction D2 was set to 2 mm from the first measurement point to the fourth measurement point from the edge of the glass plate. Also, the above scanning along the second direction D2 was repeated at an interval of 20 mm in the first direction D1, and accordingly, the distance d was measured on the glass plate at intervals of 20 mm×20 mm in a grid pattern. Also, with regard to the first direction D1, scanning was not performed along an edge of the glass plate, and scanning was performed in the second direction D2 on the inner side located 5 mm from an edge of the glass plate in the first direction D1, and was repeated in the second direction D2 at intervals of 20 mm in the first direction D1. Scanning was performed from above the glass plate using the laser displacement meter.

Then, the values of the series of distances d measured at each instance of scanning along the second direction D2 were checked in order along the scan direction. The position where the amount of change in the value of the distance d was first 0, the position where the value of the distance d first changed from an increase to a decrease, or the position where the value of the distance d first changed from a decrease to an increase was set as the warpage start position $d_2$. It is assumed that the distance d increases monotonically to a measurement point that is 60 mm from the first measurement point along the second direction D2, and the distance d changes from an increase to a decrease for the first time at a measurement point that is 80 mm from the first measurement point, for example. In this case, the warpage start position $d_2$ is equal to 80 mm. Incidentally, the warpage amount $d_1$ is defined as a difference between the distance d measured at an edge and the distance d measured at the warpage start position $d_2$.

From the results shown in FIGS. 11A and 11B, it was confirmed that end portions of the tempered glass plates can warp regardless of the presence or absence of the Low-E film. However, it was confirmed that the warpage amount $d_1$ of the end portions of the glass plate provided with no Low-E film was larger than that of a glass plate provided with a Low-E film, and a proportion $d_1/d_2$ of warpage of the end portions of the glass plate provided with a Low-E film was larger than that of a glass plate provided with no Low-E film. Also, it was found that the warpage amount $d_1$ was generally within 0.6 mm, even in consideration of variation in the measurement points.

Also, in the experiments in FIGS. 11A and 11B, outer peripheral sealing portions were formed on the tempered glass plates G1 to G5, H1, and H2 using solder. When the surface compressive stress values (averages) of the tempered glass plates G1 to G5, H1, and H2 were measured before and after heating, the surface compressive stress values did not change before and after heating, and were respectively 99 MPa, 100 MPa, 80 MPa, 90 MPa, 98 MPa, 98 MPa, and 99 MPa. Therefore, it was confirmed that heating with solder did not soften the tempering of the tempered glass plates.

Figure 7A:
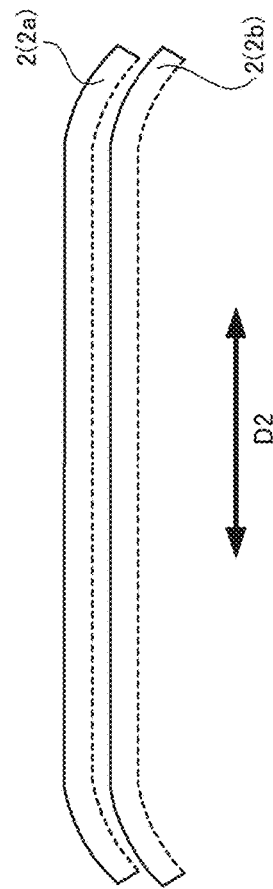
FIG. 7A is a diagram showing a pattern 1 in which two glass plates face each other.
Figure 7B:
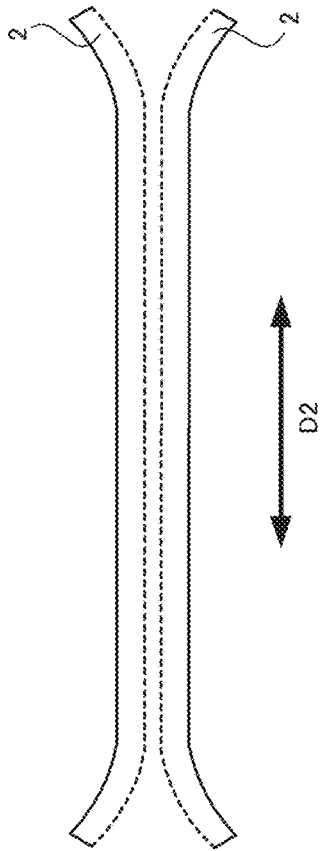
FIG. 7B is a diagram showing a pattern 2 in which two glass plates face each other.
Figure 7C:
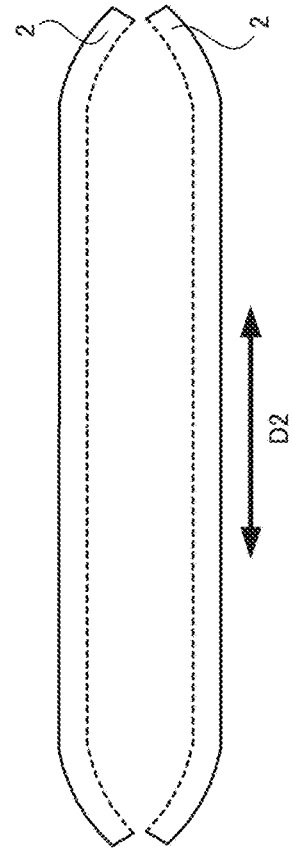
FIG. 7C is a diagram showing a pattern 3 in which two glass plates face each other.

Returning to the description of the manufacturing method, after tempering through air cooling, the float glass plate 2a, which will form the first glass plate 10, and a float glass plate 2b, which will form the second glass plate 20, were opposed to each other such that the space to ultimately serve as a depressurized layer is formed therebetween. Specifically, the glass plate 2a is placed on a work stand 54 shown in FIG. 8 with the low-emissivity film 11 facing upward, and the spacers 30 are arranged on the upper surface of the glass plate 2a in a predetermined pattern. Then, the glass plate 2b is placed thereon from above. Three patterns shown in FIGS. 7A to 7C are conceivable as preferable forms of the pattern in which the glass plates 2 face each other. Note that, in FIGS. 7A to 7C, similarly to FIGS. 4A and 4B, surfaces of the float glass plates 2 indicated by dotted lines are surfaces that are not in contact with the rollers 40a in the process for tempering through air cooling.

FIG. 7A shows a pattern (referred to as a "pattern 1" hereinafter) in which the float glass plates 2 are warped in the same direction at both ends thereof in the second direction D2. FIG. 7B shows a pattern (referred to as a "pattern 2" hereinafter) in which the float glass plates 2 are warped such that the float glass plates 2 separate further from each other toward the outer side in the second direction D2 at both ends thereof in the second direction D2. FIG. 7C shows a pattern (referred to as a "pattern 3" hereinafter) in which the float glass plates 2 are warped such that the float glass plates 2 approach closer to each other toward the outer side in the second direction D2 at both ends thereof in the second direction D2. Note that the warpage of the glass plates 2 shown in FIGS. 4A, 4B, and 7A to 7C are emphasized to facilitate understanding of the description, and the warpage amount with respect to the thickness of the glass plates 2 is actually smaller than in these drawings, and it can be said that the glass plates 2 are substantially flat on visual inspection. Therefore, the pattern of the glass plates 2 can be determined as follows.

First, similarly to the measuring method described with reference to FIG. 5, the amount of displacement $d_g$ of a glass plate was measured from the origin along the second direction D2 at a measurement pitch of 20 mm. Then, a line graph passing through these measurement points of the amount of displacement $d_g$ is drawn within graph areas such as shown in FIGS. 6A and 6B. Then, the minimum or maximum point (referred to as an extreme point hereinafter) that first appears on the line graph from the origin in the second direction D2 is specified. If the extreme point is within 100 mm from the origin, it is determined whether the line graph goes further up or down toward the outer side of a section from the origin to the extreme point. Then, if the line graph goes up, it is determined that an end portion of the glass plate on the origin side along the second direction is warped upward, whereas if the line graph goes down, it is determined that the same end portion is warped downward. On the other hand, if the extreme point is not within 100 mm from the origin, it is determined whether the line graph goes further up or down toward the outer side of a 100 mm section from the origin. Then, if the line graph goes up, it is determined that an end portion of the glass plate on the origin side along the second direction is warped upward, whereas if the line graph goes down, it is determined that the same end portion is warped downward. Note that the "extreme point" here refers to a point where the positive and negative of the slope of the line graph are switched before and after the point. Also, similarly, at an end portion of the glass plate on the opposite side to the origin in the second direction, it is determined whether the end portion is warped upward or downward, focusing on a 100 mm section from the end portion in the above-described line graph. Then, as described above, the direction of warpage of the two end portions of the glass plate along the second direction are specified, and a warpage pattern is specified based on this.

In the pattern 1 shown in FIG. 7A, the upper glass plate 2 in FIG. 7A is the glass plate 2a provided with the low-emissivity film 11. That is, the low-emissivity film 11 will ultimately be disposed facing the depressurized layer 3, and is thus is disposed so as to face inward. In the pattern 1, both ends in the second direction D2 are curved in the same direction, and thus the interval between the glass plates 2a and 2b is generally constant at these end portions. Therefore, the soldering process, which will be described later, can be easily performed because a solder introduction plate can be easily inserted between the two glass plates 2. Accordingly, stable adhesive strength can be obtained.

However, if the warpage amount increases at an end portion of the glass plate, adhesive strength may decrease. In view of this, in the pattern 1 shown in FIG. 7A, the warpage amount preferably ranges from 0.1 mm to 0.6 mm from the viewpoint of facilitating insertion of the solder introduction plate and ensuring stable adhesive strength. Note that the "warpage amount" here can be measured as the above-described amount of displacement $d_g$.

Also, vacuum glass in which a Low-E film is formed on only one glass plate may be manufactured in the form of the pattern 1 shown in FIG. 7A. In this case, as described above, if the Low-E film is provided, the warpage amount at end portions of the glass plate decreases, and thus the solder introduction plate can be easily inserted, and stable adhesive strength can be ensured.

In the pattern 2 shown in FIG. 7B, either one of the glass plates 2 may be the glass plate 2a. In the pattern 2, the space between the glass plates 2a and 2b opens at both ends thereof in the second direction D2. Therefore, the soldering process, which will be described later, can be easily performed because the solder introduction plate can be easily inserted between the two glass plates 2. In view of this effect, the pattern 2 can be preferably adopted in a case where the vacuum glass 1 is constituted by the glass plates 2a and 2b that have no Low-E films, that is, in which the end portions have a large warpage amount (see the results in FIG. 11A). Also, in the example shown in FIG. 7B, because the surfaces (the surfaces that are not in contact with the rollers 40a) of the glass plates 2a and 2b to which minimal dirt adheres face inward, in the evacuation process, which will be described later, there is no dirt that interferes with this process, and this process can be easily controlled. However, the surface of one or both of the glass plates 2a and 2b that is not in contact with the rollers 40a in the process for tempering through air cooling may face outward. In this case as well, the solder introduction plate can be easily inserted between the two glass plates 2 in the soldering process, and this soldering process can be easily performed.

As described above, if the warpage amount increases at an end portion of the glass plate, adhesive strength may decrease. In view of this, in the pattern 2 shown in FIG. 7B, the warpage amount preferably ranges from 0.1 mm to 0.6 mm from the viewpoint of facilitating insertion of the solder introduction plate and ensuring stable adhesive strength. Note that the "warpage amount" here also can be measured as the above-described amount of displacement $d_g$.

Vacuum glass in which a Low-E film is formed on only one glass plate may be manufactured in the form of the pattern 2 shown in FIG. 7B. In this case, as described above, if the Low-E film is provided, the warpage amount at end portions of the glass plate decreases, and thus the solder introduction plate can be easily inserted, and stable adhesive strength can be ensured. From the viewpoint of ensuring adhesive strength in particular, such vacuum glass is superior to vacuum glass in which two glass plates are not provided with the Low-E films.

In the pattern 3 shown in FIG. 7C, either one of the glass plates 2 may be the glass plate 2a. In the pattern 3, the space between the glass plates 2a and 2b closes at both ends thereof in the second direction D2. Therefore, the pattern 3 has good effects in that the outer peripheral sealing portion 31 made of solder formed between the glass plates 2a and 2b is unlikely to detach in the soldering process, which will be described later. In view of this effect, the pattern 3 can be preferably adopted in a case where the vacuum glass 1 is constituted by the glass plates 2a and 2b that have a Low-E film, that is, in which the proportion $d_1/d_2$ of warpage of end portions is large (see the results in FIG. 11B). Also, in the example shown in FIG. 7C, because the surfaces (the surfaces that are not in contact with the rollers 40a) of the glass plates 2a and 2b to which minimal dirt adheres face inward, in the evacuation process, which will be described later, there is no dirt that interferes with this process, and this process can be easily controlled. However, the surface of one or both of the glass plates 2a and 2b that is not in contact with the rollers 40a in the process for tempering through air cooling may face outward. In this case as well, the pattern 3 has good effects in that the outer peripheral sealing portion 31 is unlikely to detach. Note that, if the warpage amount at the end portions of the glass plate is excessively large and the end portions of the glass plate may interfere with the process in the form of the pattern 3, it is sufficient that the thickness of the depressurized layer is adjusted to be set to a value that can avoid such a situation.

Figure 8:
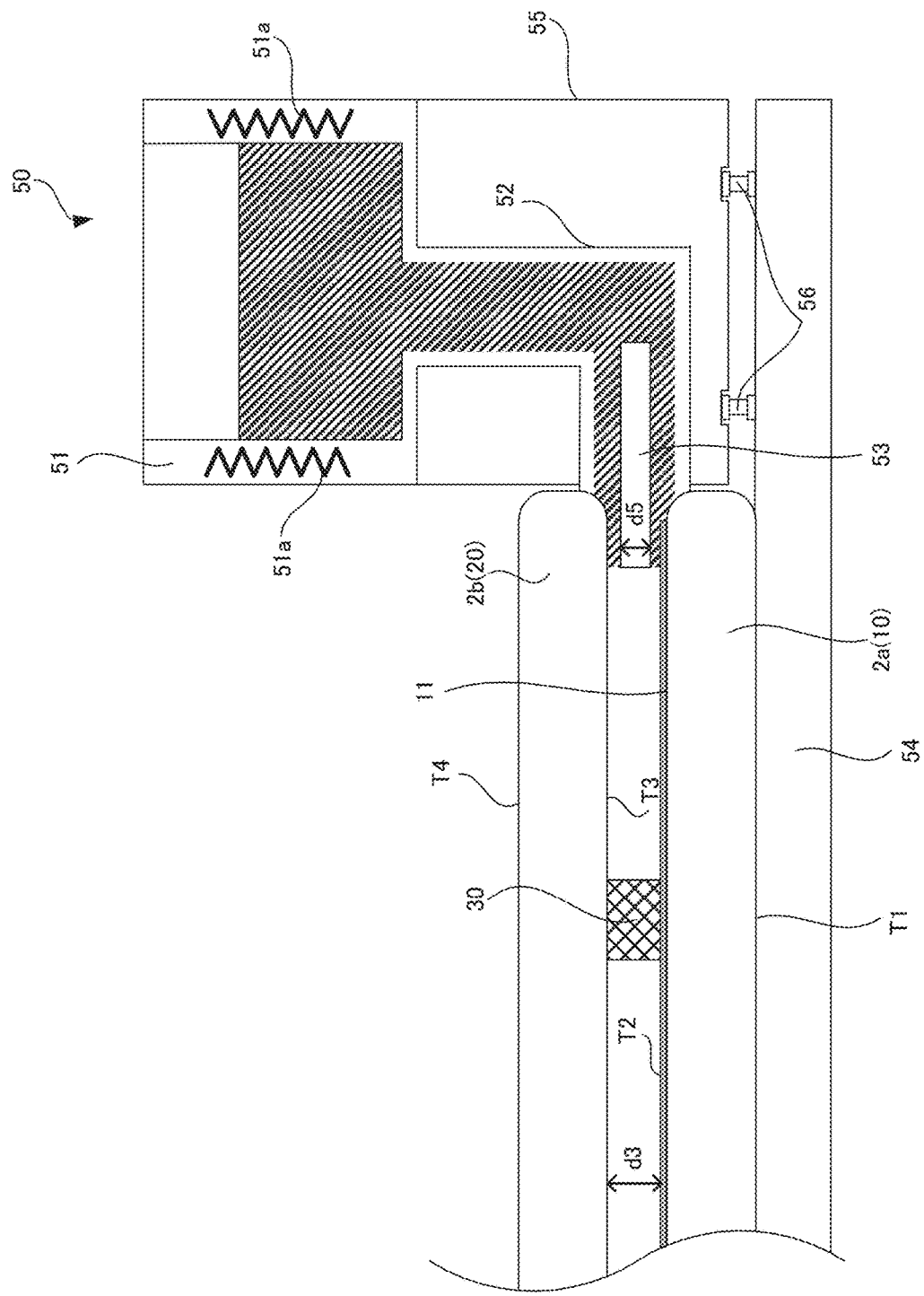
FIG. 8 is a diagram illustrating a soldering process performed by a solder supply device.

After the glass plates 2a and 2b are arranged to face each other, outer peripheral edge portions of the glass plates 2a and 2b are joined together by solder so as to seal the space between the glass plates 2a and 2b. At this time, a solder supply device 50 such as shown in FIG. 8 is used. The solder supply device 50 includes a storage container 51 in which molten solder is stored, and a discharge pipe 52 that is continuous with a hole formed in the bottom surface of the storage container 51 and discharges molten solder through the hole. The storage container 51 is provided with a heater 51a for maintaining the molten state of solder. A leading end portion of the discharge pipe 52 is aligned with the space between the glass plates 2a and 2b at the outer peripheral edge portions thereof, and an introduction plate 53 is inserted into the leading end portion of the discharge pipe 52. The introduction plate 53 is a member for introducing solder while guiding the solder between the glass plates 2a and 2b. The introduction plate 53 protrudes from the discharge pipe 52, and the protruding portion is inserted into the space between the glass plates 2a and 2b. Note that the leading end portion of the introduction plate 53 may have a deformable accordion shape. In this case, it is possible to perform soldering while rubbing the surfaces of the glass plates 2a and 2b using the leading end portion of the introduction plate 53, and to increase adhesive strength. Therefore, when the thickness of the leading end portion of the introduction plate 53 is d5, d5>d3 (the thickness of the depressurized layer 3) may hold true. A housing 55 that supports the storage container 51 and the discharge pipe 52 is also placed on the work stand 54 on which the glass plates 2a and 2b are placed, and moves on the work stand 54 along the outer peripheral edge portions of the glass plates 2a and 2b. In order to assist this movement, rails 56 corresponding to grooves provided in a lower portion of the housing 55 are provided on the work stand 54.

Next, the space between the glass plates 2a and 2b is evacuated and depressurized. More specifically, an exhaust cup is attached onto the glass plate 2a to cover the through-hole 15 in the glass plate 2a. Then, gas molecules in the space between the glass plates 2a and 2b are sucked through the through-hole 15 using a pump such as rotary pump or turbo molecular pump connected to this exhaust cup. Thereafter, solder is dropped into the through-hole 15 as a sealing material to bond the solder and the surface of the glass plate 2a near the through-hole 15. Accordingly, the through-hole 15 is sealed, and the depressurized layer 3 is formed between the glass plates 2a and 2b.

Warping of the glass plates 2a and 2b is eliminated or mitigated through the evacuation process, and substantially flat first glass plates 10 and second glass plate 20 are formed. As described above, vacuum glass 1 having a pair of air-cooled tempered glass plates 10 and 20 is manufactured.

Although an embodiment of the present invention has been described above, the present invention is not limited to the above embodiment, and various modifications can be made without departing from the gist of the invention.

Although the glass plate 10 is used as a glass plate having a Low-E film in the above-described embodiment, the glass plate 10 may be used as a normal float glass plate that does not have a Low-E film, for example.

LIST OF REFERENCE NUMERALS

1 Vacuum glass
2 Float glass plate
10 First glass plate
10a Edge surface
20 Second glass plate
20a Edge surface
3 Depressurized layer
30 Spacer 31 Outer peripheral sealing portion
D1 First direction
D2 Second direction
T1 First surface (principal surface)
T2 Second surface (principal surface)
T3 Third surface (principal surface)
T4 Fourth surface (principal surface)

The invention claimed is:

1. Vacuum glass comprising:
an air-cooled tempered first glass plate;
an air-cooled tempered second glass plate that faces the first glass plate via a depressurized layer; and
an outer peripheral sealing portion joining at least an outermost peripheral edge portion of the first glass plate and at least an outermost peripheral edge portion of the second glass plate together so as to seal the depressurized layer,
wherein
the outer peripheral sealing portion contains solder and the first glass plate and the second glass plate each have a substantially rectangular shape that has two sides extending in a first direction and two sides extending in a second direction that is orthogonal to the first direction, when viewed in a direction that is orthogonal to principal surfaces thereof, and
are warped to separate further from each other toward an outer side in the second direction at both ends in the second direction when viewed in the first direction in a state in which no external force is applied, and
a warpage amount ranges from 0.1 mm to 0.6 mm.

2. The vacuum glass according to claim 1, wherein a principal surface of the first glass plate and a principal surface of the second glass plate have substantially the same area, and the first glass plate and the second glass plate are arranged such that edge surfaces that are wide in a thickness direction are generally flush with each other.

3. The vacuum glass according to claim 1, wherein the solder is lead-free solder.

* * * * *